United States Patent
Kim et al.

(10) Patent No.: US 10,116,392 B1
(45) Date of Patent: Oct. 30, 2018

(54) CARRIER SUPPRESSED MULTI-LEVEL PULSE AMPLITUDE MODULATION

(71) Applicant: Fujitsu Limited, Kawasaki-shi, Kanagawa (JP)

(72) Inventors: Inwoong Kim, Allen, TX (US); Olga Vassilieva, Plano, TX (US); Paparao Palacharla, Richardson, TX (US); Tadashi Ikeuchi, Plano, TX (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/875,883

(22) Filed: Jan. 19, 2018

(51) Int. Cl.
| | |
|---|---|
| *H04B 10/00* | (2013.01) |
| *H04B 10/516* | (2013.01) |
| *H04B 10/58* | (2013.01) |
| *G02F 1/225* | (2006.01) |
| *H04B 10/60* | (2013.01) |
| *H04J 14/00* | (2006.01) |
| *G02F 1/21* | (2006.01) |

(52) U.S. Cl.
CPC ....... *H04B 10/5161* (2013.01); *G02F 1/2252* (2013.01); *H04B 10/58* (2013.01); *H04B 10/60* (2013.01); *G02F 2001/212* (2013.01)

(58) Field of Classification Search
CPC .............. H04B 10/516; H04B 10/5165; H04B 10/524; H04B 10/54; H04B 10/541
See application file for complete search history.

(56) References Cited

U.S. PATENT DOCUMENTS

| | | | |
|---|---|---|---|
| 6,424,444 B1 * | 7/2002 | Kahn ................. | H04B 10/5161 398/141 |
| 2006/0171723 A1 * | 8/2006 | Bigo .................... | H04B 10/505 398/188 |

* cited by examiner

*Primary Examiner* — Daniel Dobson
(74) *Attorney, Agent, or Firm* — Baker Botts L.L.P.

(57) ABSTRACT

Carrier suppression (CS-M-PAM) may be applied to M-PAM modulated optical signals to improve transmission reach. Additional rescaling of CS-M-PAM, referred to as adaptive CS-M-PAM, may further improve transmission reach by reducing low level symbol interference.

19 Claims, 10 Drawing Sheets

CARRIER SUPPRESSED MULTI-LEVEL PULSE AMPLITUDE MODULATION

BACKGROUND

Field of the Disclosure

The present disclosure relates generally to optical communication networks and, more particularly, to carrier suppressed multi-level pulse amplitude modulation (M-PAM).

Description of the Related Art

Telecommunications systems, cable television systems and data communication networks use optical networks to rapidly convey large amounts of information between remote points. In an optical network, information is conveyed in the form of optical signals through optical fibers. Optical networks may also include various network nodes such as amplifiers, dispersion compensators, multiplexer/demultiplexer filters, wavelength selective switches, couplers, etc. to perform various operations within the network.

In particular, optical networks are increasingly being used in different types of applications and environments, in addition to wide area connections between remote points that can be hundreds of kilometers apart. For example, intra- and inter-data center connections may increasingly rely upon a low cost, yet high data rate optical network for optimal performance and economic feasibility.

SUMMARY

In one aspect, a method for carrier suppressed multi-level pulse amplitude modulation is disclosed. The method may include receiving input data for transmission over an optical network, and mapping the input data for M multi-levels of pulse amplitude modulation to generate modulation data, the modulation data including symbols at one of the M multi-levels that represent the input data according to a scaling. In the method, the modulation data may specify an alternating phase of 0 degrees and 180 degrees respectively for each successive symbol. The method may further include applying the modulation data to an optical modulator to pulse amplitude modulate the modulation data onto an optical wavelength to generate an output optical signal for transmission over the optical network.

In any of the disclosed implementations of the method, the optical modulator may be a Mach-Zehnder modulator.

In any of the disclosed implementations of the method, mapping the input data may further include applying a linear scaling for the scaling in which a zero value in the input data is mapped to a zero value in the modulation data.

In any of the disclosed implementations of the method, mapping the input data may further include mapping using the linear scaling for levels 0 to M−1 of the M multi-levels. In the optical transmitter, a first difference in level between level 0 and level 1 may be increased to be greater than a second difference between successive levels in the linear scaling.

In any of the disclosed implementations of the method, mapping the input data may further include applying a non-linear scaling for the scaling in which a zero value in the input data is mapped to a greater-than-zero value in the modulation data.

In any of the disclosed implementations, the method may further include applying a fixed pre-compensation for chromatic dispersion to the output optical signal.

In a further aspect, an optical transmitter for carrier suppressed multi-level pulse amplitude modulation is disclosed. The transmitter may include a data mapping module enabled for receiving input data for transmission over an optical network, and mapping the input data for M multi-levels of pulse amplitude modulation to generate modulation data, the modulation data including symbols at one of the M multi-levels that represent the input data according to a scaling. In the optical transmitter, the modulation data may specify an alternating phase of 0 degrees and 180 degrees respectively for each successive symbol. The optical transmitter may further include an optical modulator enabled for receiving the modulation data and for pulse amplitude modulating the modulation data onto an optical wavelength to generate an output optical signal for transmission over the optical network.

In any of the disclosed embodiments of the optical transmitter, the optical modulator may be a Mach-Zehnder modulator.

In any of the disclosed embodiments of the optical transmitter, mapping the input data may further include applying a linear scaling for the scaling in which a zero value in the input data is mapped to a zero value in the modulation data.

In any of the disclosed embodiments of the optical transmitter, mapping the input data may further include mapping using the linear scaling for levels 0 to M−1 of the M multi-levels. In the optical transmitter, a first difference in level between level 0 and level 1 may be increased to be greater than a second difference between successive levels in the linear scaling.

In any of the disclosed embodiments of the optical transmitter, mapping the input data may further include applying a non-linear scaling for the scaling in which a zero value in the input data is mapped to a greater-than-zero value in the modulation data.

In any of the disclosed embodiments, the optical transmitter may further include a chromatic dispersion compensator for applying a fixed pre-compensation for chromatic dispersion to the output optical signal.

In yet a further aspect, an optical network system for carrier suppressed multi-level pulse amplitude modulation is disclosed. The optical network system may include an optical transmitter, which in turn may further include a data mapping module and an optical modulator. In the optical network system, the data mapping module may be enabled for receiving input data for transmission over an optical network, and mapping the input data for M multi-levels of pulse amplitude modulation to generate modulation data, the modulation data including symbols at one of the M multi-levels that represent the input data according to a scaling. In the optical network system, the modulation data may specify an alternating phase of 0 degrees and 180 degrees respectively for each successive symbol. In the optical network system, the optical modulator may be enabled to receive the modulation data and to pulse amplitude modulate the modulation data onto an optical wavelength to generate an optical signal for transmission over the optical network.

In any of the disclosed embodiments, the optical network system may further include an optical receiver enabled for receiving the optical signal after transmission over the optical network, and demodulating the optical signal to reconstruct the input data. In the optical receiver, an inverse of the scaling may be applied to the optical signal to reconstruct the input data.

In any of the disclosed embodiments of the optical network system, the optical modulator may be a Mach-Zehnder modulator.

In any of the disclosed embodiments of the optical network system, mapping the input data may further include applying a linear scaling for the scaling in which a zero value in the input data is mapped to a zero value in the modulation data.

In any of the disclosed embodiments of the optical network system, mapping the input data may further include mapping using the linear scaling for levels 0 to M−1 of the M multi-levels. In the optical network system, a first difference in level between level 0 and level 1 may be increased to be greater than a second difference between successive levels in the linear scaling.

In any of the disclosed embodiments of the optical network system, mapping the input data may further include applying a non-linear scaling for the scaling in which a zero value in the input data is mapped to a greater-than-zero value in the modulation data.

In any of the disclosed embodiments, the optical network system may further include a chromatic dispersion compensator for applying a fixed pre-compensation for chromatic dispersion to the optical signal prior to transmission over the optical network.

BRIEF DESCRIPTION OF THE DRAWINGS

For a more complete understanding of the present invention and its features and advantages, reference is now made to the following description, taken in conjunction with the accompanying drawings, in which.

DESCRIPTION OF THE EMBODIMENT(S)

Figure 1:
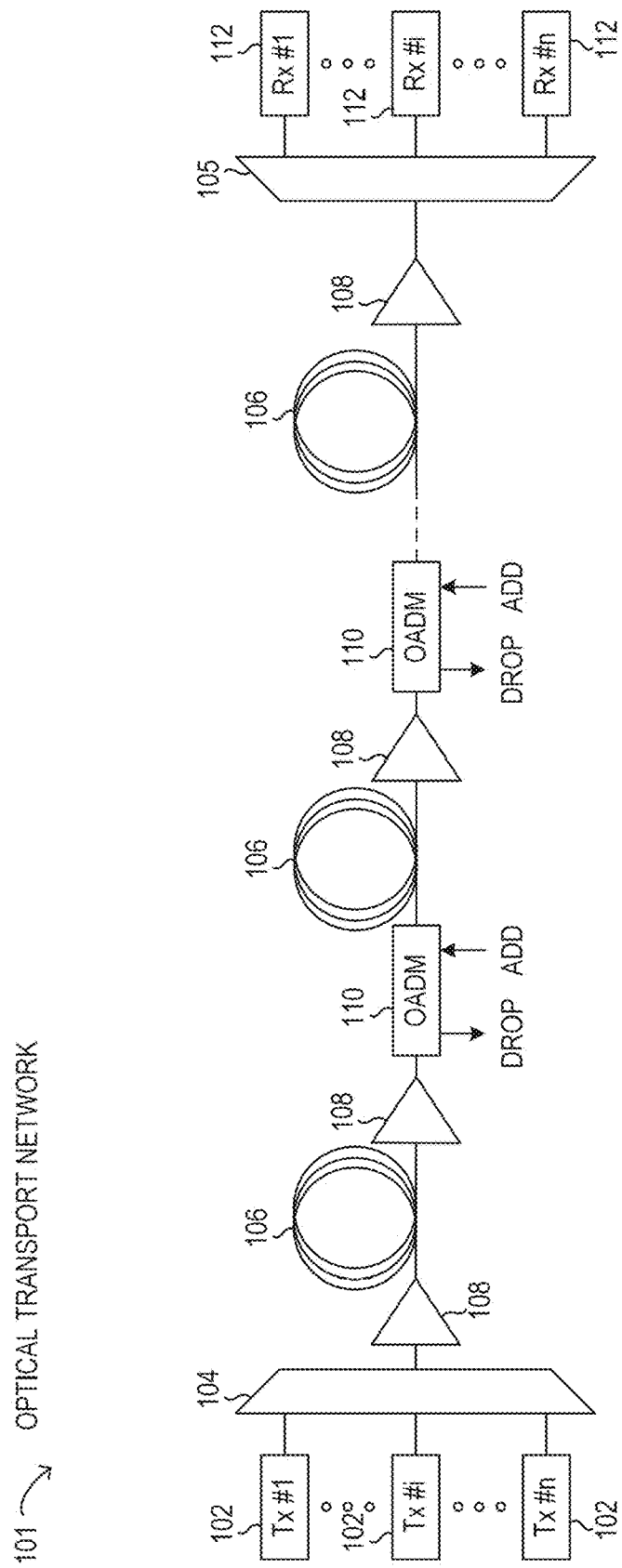
FIG. 1 is a block diagram of selected elements of an embodiment of an optical transport network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

Telecommunications systems, cable television systems and data communication networks use optical networks to rapidly convey large amounts of information between remote points. In an optical network, information is conveyed in the form of optical signals through optical fibers. Optical networks may also include various network nodes such as amplifiers, dispersion compensators, multiplexer/demultiplexer filters, wavelength selective switches, couplers, etc. to perform various operations within the network.

As noted, optical networks are increasingly being used in applications involving a low cost, yet high data rate for optimal performance and economic feasibility. In particular, multi-level pulse amplitude modulation (M-PAM) is a widely used modulation format in such optical network applications. However, the reach of M-PAM optical signals may be limited by susceptibility to chromatic dispersion (CD), and conventional methods of chromatic dispersion compensation may be too expensive for the given application of the optical network. Additionally, an advantage of M-PAM is the relatively simple transmitter and receiver that can be used without digital signal processing (DSP), but the DSP remains unavailable for compensating certain channel impairments.

As will be disclosed in further detail, carrier suppressed multi-level pulse amplitude modulation (CS-M-PAM) may be implemented in optical networks. While M-PAM with direct detection may improve spectral efficiency for low cost high data rate transponders, the transmission reach of M-PAM may be limited due to inter-symbol interference caused by CD. Direct detection uses a single photo-diode and outputs electrical current proportional to optical pulse amplitude. The methods and systems disclosed herein for CS-M-PAM may suppress pulse spreading by CD such that CS-M-PAM may provide better CD tolerance than simple M-PAM. The methods and systems disclosed herein for CS-M-PAM may provide a greater tolerability to residual CD than simple M-PAM, while using the same low cost photodiode-based direct detection at the receiver. The methods and systems disclosed herein for CS-M-PAM may provide low-cost solutions for relatively short transmission reaches with high data rate transmission. The methods and systems disclosed herein for CS-M-PAM may be used without complex computational architectures, such as with DSP and coherent optical transponders, which may enable the use of small form factor transponders without excessive complexity or cost. Furthermore, it has been observed that symbol errors may occur more frequently at lower amplitude levels, for example, when 28 Gb/s CS-16-PAM is transmitted about 100 km without CDC (including 12% forward error correction (FEC) overhead). Accordingly, the methods and systems disclosed herein for CS-M-PAM may provide adaptive CS-M-PAM that further improves the transmission reach without CDC. In adaptive CS-M-PAM, M-levels of symbol pulse amplitude may be adjusted and rescaled to improve the transmission performance without CDC. Since CS-M-PAM may have a large residual CD tolerance, the methods and systems disclosed herein for CS-M-PAM may apply a fixed CDC with adaptive CS-M-PAM to enable increased transmission range without the resources and effort involved with the customized tuning of CDC for every individual transmission path.

Referring now to the drawings, FIG. 1 illustrates an example embodiment of optical transport network (OTN) 101, which may represent an optical communication system. Optical transport network 101 may include devices to transmit optical signals over optical fibers 106. Information may be transmitted and received through optical transport network 101 by modulation of one or more wavelengths of light to encode the information on the wavelength. In optical networking, a wavelength of light may also be referred to as a "channel" that is included in an optical signal. Each channel may carry a certain amount of information through optical transport network 101.

Optical transport network 101 includes one or more optical fibers 106 to transport one or more optical signals communicated by components of optical transport network 101. The network elements of optical transport network 101, coupled together by fibers 106, may comprise one or more transmitters (Tx) 102, one or more multiplexers (MUX) 104, one or more optical amplifiers 108, one or more optical add/drop multiplexers (OADM) 110, one or more demultiplexers (DEMUX) 105, and one or more receivers (Rx) 112.

Optical transport network 101 may comprise a point-to-point optical network with terminal nodes, a ring optical network, a mesh optical network, or any other suitable optical network or combination of optical networks. Optical transport network 101 may be used in a short-haul metropolitan network, a long-haul inter-city network, or any other suitable network or combination of networks. The capacity of optical transport network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a standard Single-Mode Fiber (SMF), Enhanced Large Effective Area Fiber (E-LEAF), or TrueWave® Reduced Slope (TW-RS) fiber.

Optical transport network 101 may include devices to transmit optical signals over optical fibers 106. Information may be transmitted and received through optical transport network 101 by modulation of one or more wavelengths of light to encode the information on the wavelength. In optical networking, a wavelength of light may also be referred to as a "channel" that is included in an optical signal. Each channel may carry a certain amount of information through optical transport network 101.

To increase the information capacity and transport capabilities of optical transport network 101, multiple signals transmitted at multiple channels may be combined into a single wide bandwidth optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm spacing and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical transport network 101 may transmit disparate channels using WDM or some other suitable multi-channel multiplexing technique, and to amplify the multi-channel signal.

Optical transport network 101 may include one or more optical transmitters (Tx) 102 to transmit optical signals through optical transport network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical transport network 101. In some embodiments, optical transmitter 102 may be used to determine the baud rate for the data to be transmitted during the optical modulation. An example of transmitter 102 for applying different baud rates is an adaptive rate transponder. Additionally, a forward error correction (FEC) module may be included in optical transmitter 102, or may be used in conjunction with optical transmitter 102. The FEC module may process the electrical signal carrying the information or data to be transmitted to include error correction codes. The FEC module at transmitter 102 may also determine a baud rate for sending the data to be transmitted to optical transmitter 102 for optical modulation.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical transport network 101. Optical amplifiers 108 may be positioned before and after certain lengths of fiber 106, which is referred to as "in-line amplification". Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of a pump signal to excite the atoms of the doped portion of the optical fiber, which increases the intensity of the optical signal. As an example, optical amplifiers 108 may comprise an erbium-doped fiber amplifier (EDFA). However, any other suitable amplifier, such as a semiconductor optical amplifier (SOA), may be used.

OADMs 110 may be coupled to optical transport network 101 via fibers 106. OADMs 110 comprise an add/drop module, which may include a system, apparatus or device to add and drop optical signals (i.e., at individual wavelengths) from fibers 106. After passing through an OADM 110, an optical signal may travel along fibers 106 directly to a destination, or the signal may be passed through one or more additional OADMs 110 and optical amplifiers 108 before reaching a destination. In this manner, OADMs 110 may enable connection of different optical transport network topologies together, such as different rings and different linear spans.

In certain embodiments of optical transport network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM.

Many existing optical networks are operated at 10 gigabit-per-second (Gbps) or 40 Gbps signal rates with 50 gigahertz (GHz) of channel spacing in accordance with International Telecommunications Union (ITU) standard wavelength grids, also known as fixed-grid spacing, which is compatible with conventional implementations of optical add-drop multiplexers (OADMs) and with conventional implementations of demultiplexers 105. However, as data rates increase to 100 Gbps and beyond, the wider spectrum requirements of such higher data rate signals often require increasing channel spacing. In traditional fixed grid networking systems supporting signals of different rates, the entire network system typically must be operated with the coarsest channel spacing (100 GHz, 200 GHz, etc.) that can accommodate the highest rate signals. This may lead to an over-provisioned channel spectrum for lower-rate signals and lower overall spectrum utilization.

Thus, in certain embodiments, optical transport network 101 may employ components compatible with flexible grid optical networking that enables specifying a particular frequency slot per channel. For example, each wavelength channel of a WDM transmission may be allocated using at least one frequency slot. Accordingly, one frequency slot may be assigned to a wavelength channel whose symbol rate is low, while a plurality of frequency slots may be assigned to a wavelength channel whose symbol rate is high. Thus, in optical transport network 101, ROADM 110 may be capable of adding or dropping individual or multiple wavelengths of a WDM, DWDM, or superchannel signal carrying data channels to be added or dropped in the optical domain. In certain embodiments, ROADM 110 may include or be coupled to a wavelength selective switch (WSS).

As shown in FIG. 1, optical transport network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical transport network 101 may transmit and carry a forty (40) channel DWDM signal. Demultiplexer 105 may divide the single, forty channel DWDM signal into forty separate signals according to the forty different channels. It will be understood that different numbers of channels or subcarriers may be transmitted and demultiplexed in optical transport network 101, in various embodiments.

In FIG. 1, optical transport network 101 may also include receivers 112 coupled to demultiplexer 105. Each receiver 112 may receive optical signals transmitted at a particular wavelength or channel, and may process the optical signals to obtain (demodulate) the information (data) that the optical signals contain. Accordingly, network 101 may include at least one receiver 112 for every channel of the network. As shown, receivers 112 may demodulate the optical signals according to a baud rate used by transmitter 102. In some embodiments, receiver 112 may include, or may be followed by, a forward error correction (FEC) module to use the error correction codes to check the integrity of the received data. The FEC module may also correct certain errors in the data based on the error correction codes. The FEC module at receiver 112 may also demodulate the data at a specific baud rate defined for each channel at transmitter 102, as described above.

Optical networks, such as optical transport network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), as well as pulse amplitude modulation (PAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

PSK and QAM signals may be represented using a complex plane with real and imaginary axes on a constellation diagram. The points on the constellation diagram representing symbols carrying information may be positioned with uniform angular spacing around the origin of the diagram. The number of symbols to be modulated using PSK and QAM may be increased and thus increase the information that can be carried. The number of signals may be given in multiples of two. As additional symbols are added, they may be arranged in uniform fashion around the origin. PSK signals may include such an arrangement in a circle on the constellation diagram, meaning that PSK signals have constant power for all symbols. QAM signals may have the same angular arrangement as that of PSK signals, but include different amplitude arrangements. QAM signals may have their symbols arranged around multiple circles, meaning that the QAM signals include different power for different symbols. This arrangement may decrease the risk of noise as the symbols are separated by as much distance as possible. A number of symbols "m" may thus be used and denoted "m-PSK" or "m-QAM."

Examples of PSK and QAM with a different number of symbols can include binary PSK (BPSK or 2-PSK) using two phases at 0° and 180° (or in radians, 0 and π) on the constellation diagram; or quadrature PSK (QPSK, 4-PSK, or 4-QAM) using four phases at 0°, 90°, 180°, and 270° (or in radians, 0, π/2, π, and 3π/2). Phases in such signals may be offset. Each of 2-PSK and 4-PSK signals may be arranged on the constellation diagram. Certain m-PSK signals may also be polarized using techniques such as dual-polarization QPSK (DP-QPSK), wherein separate m-PSK signals are multiplexed by orthogonally polarizing the signals. Also, m-QAM signals may be polarized using techniques such as dual-polarization 16-QAM (DP-16-QAM), wherein separate m-QAM signals are multiplexed by orthogonally polarizing the signals.

As will be shown in further detail herein, PAM involves scaling the amplitude or intensity of each symbol pulse in the modulated signal to carry information from the input signal. One simple binary implementation of PAM is on-off keying (OOK) or 2-PAM, in which a high amplitude carries a bit value of 1, while a low amplitude carries a bit value of 0 in a single symbol pulse. With multi-level PAM (M-PAM), a number of different levels or values may be encoded to each symbol pulse in the modulated signal. For example, 4-PAM involves 4 amplitude levels per symbol pulse, enabling 2 bits of data to be carried per symbol pulse.

Dual polarization technology, which may also be referred to as polarization division multiplexing (PDM), enables achieving a greater bit rate for information transmission. PDM transmission comprises simultaneously modulating information onto various polarization components of an optical signal associated with a channel, thereby nominally increasing the transmission rate by a factor of the number of polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In an optical network, such as optical transport network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, or an operational support system (OSS) which handles network-wide operations.

Modifications, additions or omissions may be made to optical transport network 101 without departing from the scope of the disclosure. For example, optical transport network 101 may include more or fewer elements than those depicted in FIG. 1. Also, as mentioned above, although depicted as a point-to-point network, optical transport network 101 may comprise any suitable network topology for transmitting optical signals such as a ring, a mesh, or a hierarchical network topology.

In operation of optical transport network 101, transmitter 102 and receiver 112 may be enabled to implement CS-M-PAM and adaptive CS-M-PAM, as disclosed herein and described in further detail below.

Figure 2A:
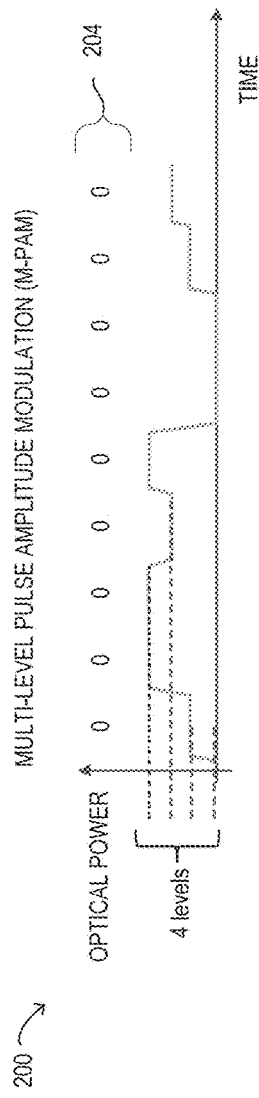
FIG. 2A depicts an amplitude versus time plot for M-PAM.

Referring to FIG. 2A, a plot 200 of optical power versus time for M-PAM is depicted. In plot 200, a 4-PAM signal is shown with a plurality of symbol pulses, whose amplitude varies according to values of an input signal (not shown) being modulated. The 4-PAM signal in plot 200 is not subject to phase modulation, and pulse phases 204 are accordingly 0 degrees for each symbol pulse. As noted, M-PAM is susceptible to CD, which can reduce the transmission reach in an undesirable manner.

Figure 2B:
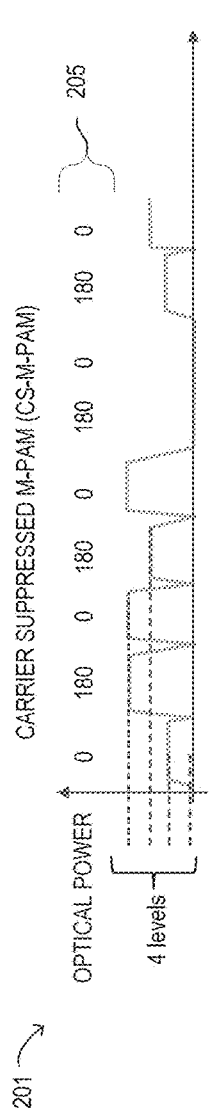
FIG. 2B depicts an amplitude versus time plot for CS-M-PAM.

Referring to FIG. 2B, a plot 201 of optical power versus time for CS-M-PAM is depicted. In plot 201, a CS-4-PAM signal is shown with a plurality of symbol pulses, whose amplitude varies according to values of an input signal (not shown) being modulated. The CS-4-PAM signal in plot 201 is additionally subject to phase modulation, and pulse phases 205 accordingly show an alternating phase of 0 and 180 degrees respectively for each successive symbol pulse. In other words, the phase is modulated between 0 degrees and 180 degrees for each successive symbol pulse, which causes the amplitude to return to zero between symbol pulses, also referred to as 'carrier suppression'. As a result of the alternating pulse phases 205, destructive interference between symbols occurs and helps to reduce or eliminate impairment by CD during transmission, which can improve transmission reach as compared with M-PAM in plot 200 (see FIG. 2A). In one example, a CS-4-PAM signal may be generated using a Mach-Zehnder modulator. The Mach-Zehnder modulator may be biased at the null point and the driving electrical signal amplitude, which is dependent on the incoming mapped data, may be the same as for 4-PAM signal generation. However, in this example, the polarity of the electrical signal alternates between 0 and 180 degrees on a symbol-by-symbol basis. In other embodiments, other mechanisms may be used to generate CS-M-PAM signals. For example, an optical IQ modulator may be used to generate a 4-PAM signal. However, this approach may be more expensive because an optical IQ modulator may include two Mach-Zehnder modulators, rather than one.

Figure 2C:
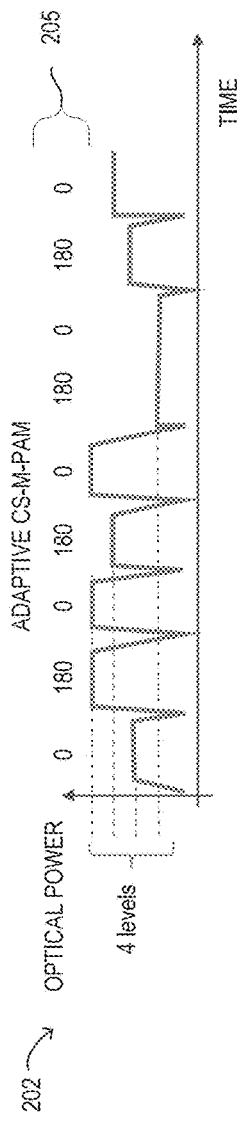
FIG. 2C depicts an amplitude versus time plot for adaptive CS-M-PAM.

Referring to FIG. 2C, a plot 202 of optical power versus time for adaptive CS-M-PAM is depicted. In plot 202, an adaptive CS-4-PAM signal is shown with a plurality of symbol pulses, whose amplitude varies according to values of an input signal (not shown) being modulated. The adaptive CS-4-PAM signal in plot 202 is additionally subject to phase modulation, as shown by pulse phases 205 described above with respect to FIG. 2B. Additionally, in the exemplary implementation of adaptive CS-4-PAM shown in plot 202, a rescaling has been applied to the amplitude scale such that an offset at low amplitude values has been introduced. Other types of linear and non-linear scaling with adaptive CS-M-PAM are described in further detail below. As a result of the rescaling, adaptive CS-4-PAM shown in plot 202 may show an improved transmission reach, because of the propensity for symbol errors to occur more frequently at lower amplitude levels with M-PAM, which are eliminated or reduced in adaptive CS-4-PAM shown in plot 202.

Figure 3:
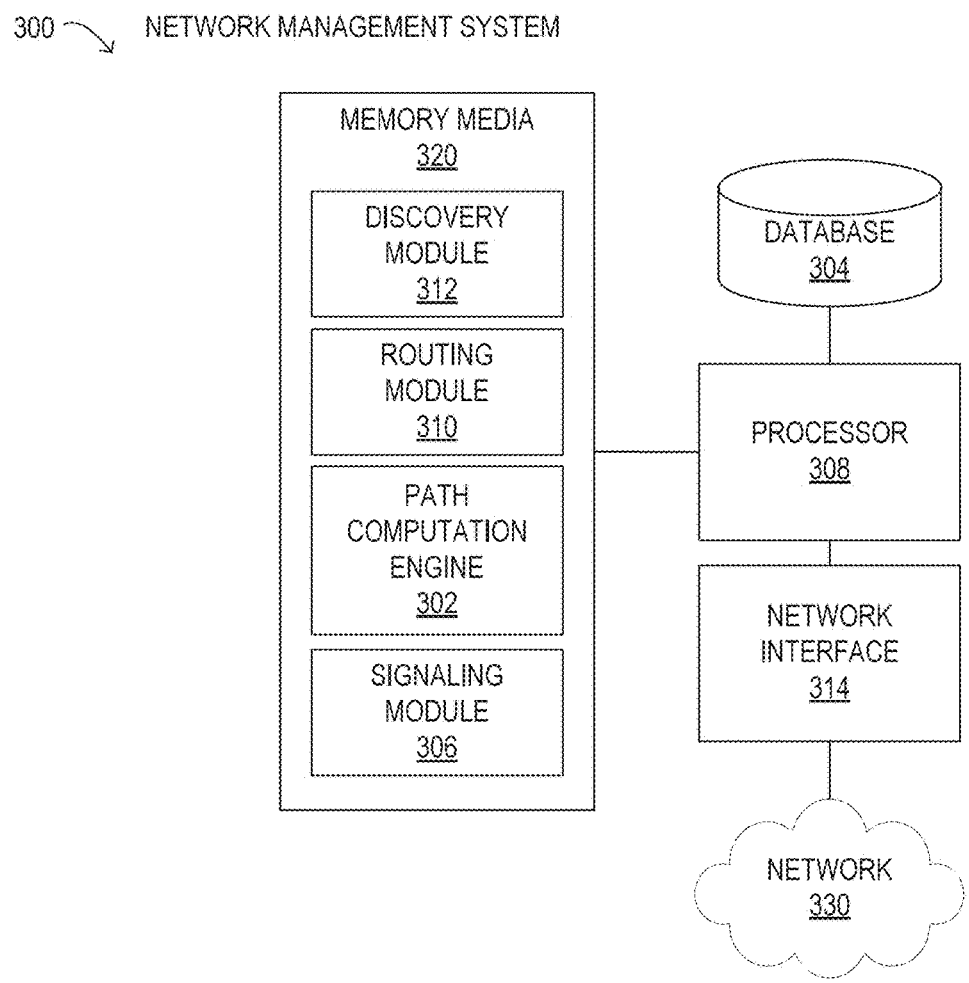
FIG. 3 is a block diagram of selected elements of an embodiment of a network management system for using M-PAM.

Referring now to FIG. 3, a block diagram of selected elements of an embodiment of network management system 300 for implementing control plane functionality in optical networks, such as, for example, in optical transport network 101 (see FIG. 1), is illustrated. A control plane may include functionality for network intelligence and control and may comprise applications that support the ability to establish network services, including applications or modules for discovery, routing, path computation, and signaling, as will be described in further detail. The control plane applications executed by network management system 300 may work together to automatically establish services within the optical network. Discovery module 312 may discover local links connecting to neighbors. Routing module 310 may broadcast local link information to optical network nodes while populating database 304. When a request for service from the optical network is received, path computation engine 302 may be called to compute a network path using database 304. This network path may then be provided to signaling module 306 to establish the requested service.

As shown in FIG. 3, network management system 300 includes processor 308 and memory media 320, which may store executable instructions (i.e., executable code) that may be executable by processor 308, which has access to memory media 320. Processor 308 may execute instructions that cause network management system 300 to perform the functions and operations described herein. For the purposes of this disclosure, memory media 320 may include non-transitory computer-readable media that stores data and instructions for at least a period of time. Memory media 320 may comprise persistent and volatile media, fixed and removable media, and magnetic and semiconductor media.

Memory media 320 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory; non-transitory media, or various combinations of the foregoing. Memory media 320 is operable to store instructions, data, or both. Memory media 320 as shown includes sets or sequences of instructions that may represent executable computer programs, namely, path computation engine 302, signaling module 306, discovery module 312, and routing module 310.

Also shown included with network management system 300 in FIG. 3 is network interface 314, which may be a suitable system, apparatus, or device operable to serve as an interface between processor 308 and network 330. Network interface 314 may enable network management system 300 to communicate over network 330 using a suitable transmission protocol or standard. In some embodiments, network interface 314 may be communicatively coupled via network 330 to a network storage resource. In some embodiments, network 330 represents at least certain portions of optical transport network 101. Network 330 may also include certain portions of a network using galvanic or electronic media. In certain embodiments, network 330 may include at least certain portions of a public network, such as the Internet. Network 330 may be implemented using hardware, software, or various combinations thereof.

In certain embodiments, network management system 300 may be configured to interface with a person (a user) and receive data about the optical signal transmission path. For example, network management system 300 may also include or may be coupled to one or more input devices and output devices to facilitate receiving data about the optical signal transmission path from the user and to output results to the user. The one or more input or output devices (not shown) may include, but are not limited to, a keyboard, a mouse, a touchpad, a microphone, a display, a touchscreen display, an audio speaker, or the like. Alternately or additionally, network management system 300 may be configured to receive data about the optical signal transmission path from a device such as another computing device or a network element, for example via network 330.

As shown in FIG. 3, in some embodiments, discovery module 312 may be configured to receive data concerning an optical signal transmission path in an optical network and may be responsible for discovery of neighbors and links between neighbors. In other words, discovery module 312 may send discovery messages according to a discovery protocol, and may receive data about the optical signal transmission path. In some embodiments, discovery module 312 may determine features, such as, but not limited to: fiber type, fiber length, number and type of components, data rate, modulation format of the data, input power of the optical signal, number of signal carrying wavelengths (i.e., channels), channel spacing, traffic demand, and network topology, among others. In embodiments in which the optical network is used to provide low cost, short reach, high speed data transmission (e.g. inter-data center transmission), topology discovery might not be necessary. For example, the optical signal transmission path may be a point-to-point linear optical link (i.e., a single link or span).

As shown in FIG. 3, routing module 310 may be responsible for propagating link connectivity information to various nodes within an optical network, such as optical transport network 101. In particular embodiments, routing module 310 may populate database 304 with resource information to support traffic engineering, which may include link bandwidth availability. Accordingly, database 304 may be populated by routing module 310 with information usable to determine a network topology of an optical network.

Path computation engine 302 may be configured to use the information provided by routing module 310 to database 304 to determine transmission characteristics of the optical signal transmission path. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), and amplified spontaneous emission (ASE), among others, may affect optical signals within the optical signal transmission path. To determine the transmission characteristics of the optical signal transmission path, path computation engine 302 may consider the interplay between the transmission degradation factors. In various embodiments, path computation engine 302 may generate values for specific transmission degradation factors. Path computation engine 302 may further store data describing the optical signal transmission path in database 304. In embodiments in which the optical network is used to provide low cost, short reach, high speed data transmission (e.g. inter-data center transmission), path computation might not be necessary. For example, the optical signal transmission path may be a point-to-point linear optical link (i.e., a single link or span).

In FIG. 3, signaling module 306 may provide functionality associated with setting up, modifying, and tearing down end-to-end networks services in an optical network, such as optical transport network 101. For example, when an ingress node in the optical network receives a service request, network management system 300 may employ signaling module 306 to request a network path from path computation engine 302 that may be optimized according to different criteria, such as bandwidth, cost, etc. When the desired network path is identified, signaling module 306 may then communicate with respective nodes along the network path to establish the requested network services. In different embodiments, signaling module 306 may employ a signaling protocol to propagate subsequent communication to and from nodes along the network path.

In operation of network management system 300, after an optical path has been provisioned, network management system 300 may configure transmitters 102 and receivers 112 to implement CS-M-PAM and adaptive CS-M-PAM, as disclosed herein.

Figure 4:
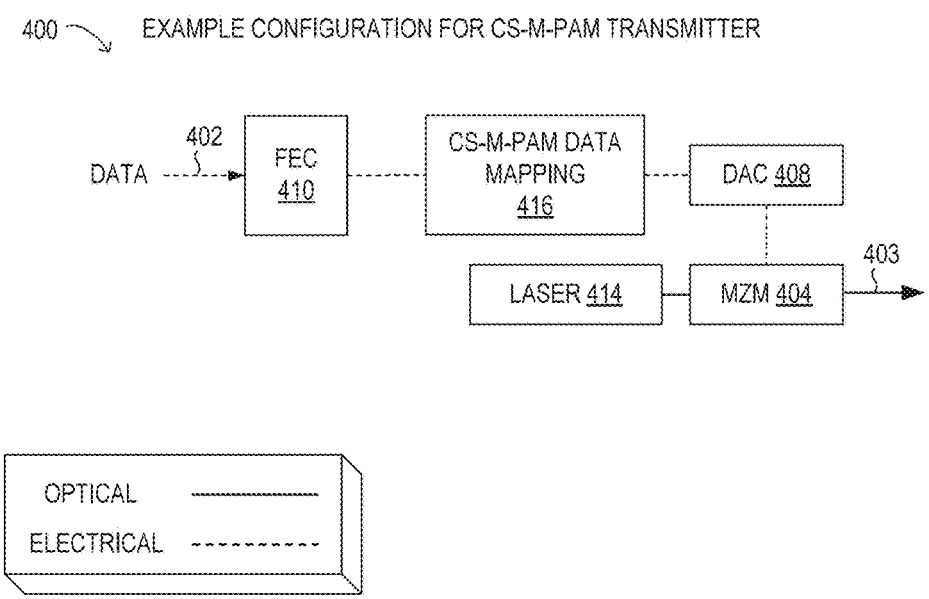
FIG. 4 is a block diagram illustrating an example configuration for a CS-M-PAM transmitter.

Referring now to FIG. 4, a block diagram illustrating an example configuration for a CS-M-PAM transmitter 400 is shown. Transmitter 400 may be an embodiment of transmitter 102 in FIG. 1. Transmitter 400 is a schematic representation and is not drawn to scale. In various embodiments, transmitter 400 may be implemented with fewer or more elements than depicted. Dashed lines in FIG. 4 represent electrical signals, including digital data logically represented by electrical signals, while solid lines represent optical signals. Although transmitter 400 is shown as a single carrier optical transmitter, it will be understood that the CS-M-PAM data mapping described herein may be used with a dual carrier optical transmitter, in different implementations. In implementations in which transmitter 400 is a dual carrier optical transmitter, transmitter 400 may include any or all of an interleaver to split incoming data among a first optical channel and a second optical channel for transmission and, for each optical channel, a respective instance of a forward error correction element, a CS-M-PAM data mapping element, a digital-analog-converter, a Mach-Zehnder modulator, and/or a laser.

As shown, transmitter 400 may receive data 402 as an input signal for transmission and may process the input signal by FEC 410, which may add forward error correction. Subsequently, CS-M-PAM data mapping 416 may perform mapping of symbol pulses for CS-M-PAM and adaptive CS-M-PAM as described herein. CS-M-PAM data mapping 416 may then output data to a digital-analog-converter DAC 408, which outputs an analog signal to a respective Mach-Zehnder modulator (MZM) 404 that performs pulse amplitude modulation using laser 414 as an optical source. In this example configuration, the CS-M-PAM (or adaptive CS-M-PAM) modulated signal is output as a single carrier optical signal, which shown in FIG. 4 as output optical signal 403.

Referring now to FIGS. 5, 6, 7, 8, and 9, eye diagrams of symbol pulses are shown for various different modulations, data rates, and transmission reaches. In the left column titled BACK-TO-BACK (BTB), eye diagrams at a receiver directly connected to a transmitter at the same location show the signal quality of the symbol pulses prior to transmission over a fiber. In the right column titled TRANSMISSION REACH X, eye diagrams at a receiver after a transmission reach X show the signal quality of the symbol pulses after transmission over a fiber, while the actual transmission reach X is given for eye diagram.

Figure 5:
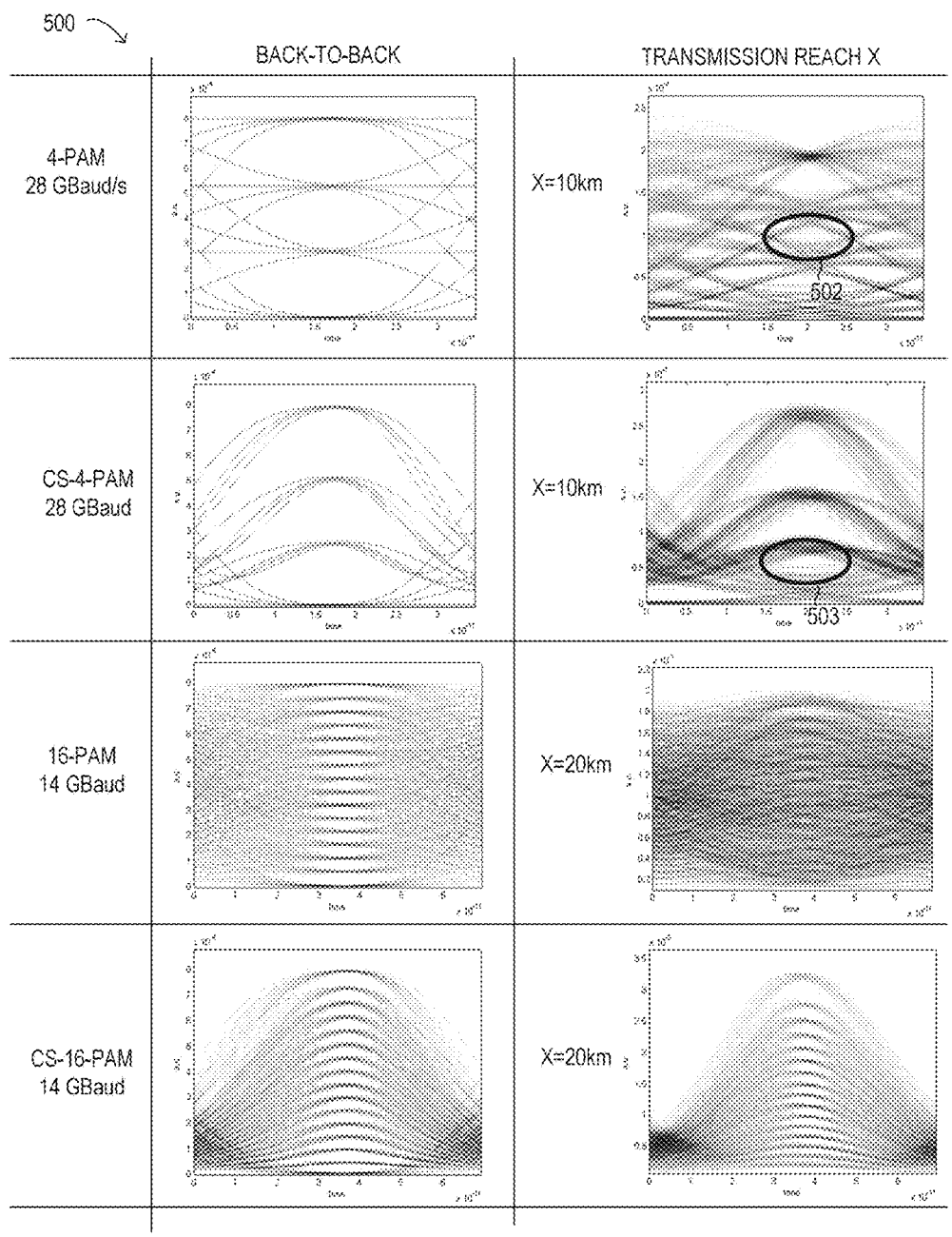
FIG. 5 depicts a set of eye diagrams.

In FIG. 5, various examples of a 56 Gb/s optical signal transmitted without CDC are shown.

In the first row of FIG. 5, 4-PAM signals are shown transmitted at 28 GBaud/s. The BTB eye diagram for 4-PAM 28 GBaud/s shows that 4 levels are clear and distinct, indicating a high optical signal-to-noise ratio (OSNR), while in the eye diagram after 10 km transmission reach, marker 502 indicates that some differences in signal levels are closing, indicating poorer OSNR.

In the second row of FIG. 5, CS-4-PAM signals are shown transmitted at 28 GBaud/s. The BTB eye diagram for CS-4-PAM 28 GBaud/s shows that 4 levels are clear and distinct, indicating a high optical signal-to-noise ratio (OSNR). In the eye diagram after 10 km transmission reach, marker 503 indicates an opening as compared to marker 502, showing an improvement in OSNR as compared to 4-PAM 28 GBaud/s in the first row.

In the third row of FIG. 5, 16-PAM signals are shown transmitted at 14 GBaud/s. The BTB eye diagram for 16-PAM 14 GBaud/s shows that 16 levels are clear and distinct, indicating a high optical signal-to-noise ratio (OSNR), while in the eye diagram after 20 km transmission reach, the 16 individual levels are barely or not distinguishable, indicating a poor or unacceptable OSNR.

In the fourth row of FIG. 5, CS-16-PAM signals are shown transmitted at 14 GBaud/s. The BTB eye diagram for CS-16-PAM 14 GBaud/s shows that 16 levels are clear and distinct, indicating a high optical signal-to-noise ratio (OSNR). In the eye diagram after 20 km transmission reach, the 16 individual levels are still distinguishable, indicating an acceptable OSNR and an improvement over 16-PAM 14 GBaud/s in the third row.

Figure 6:
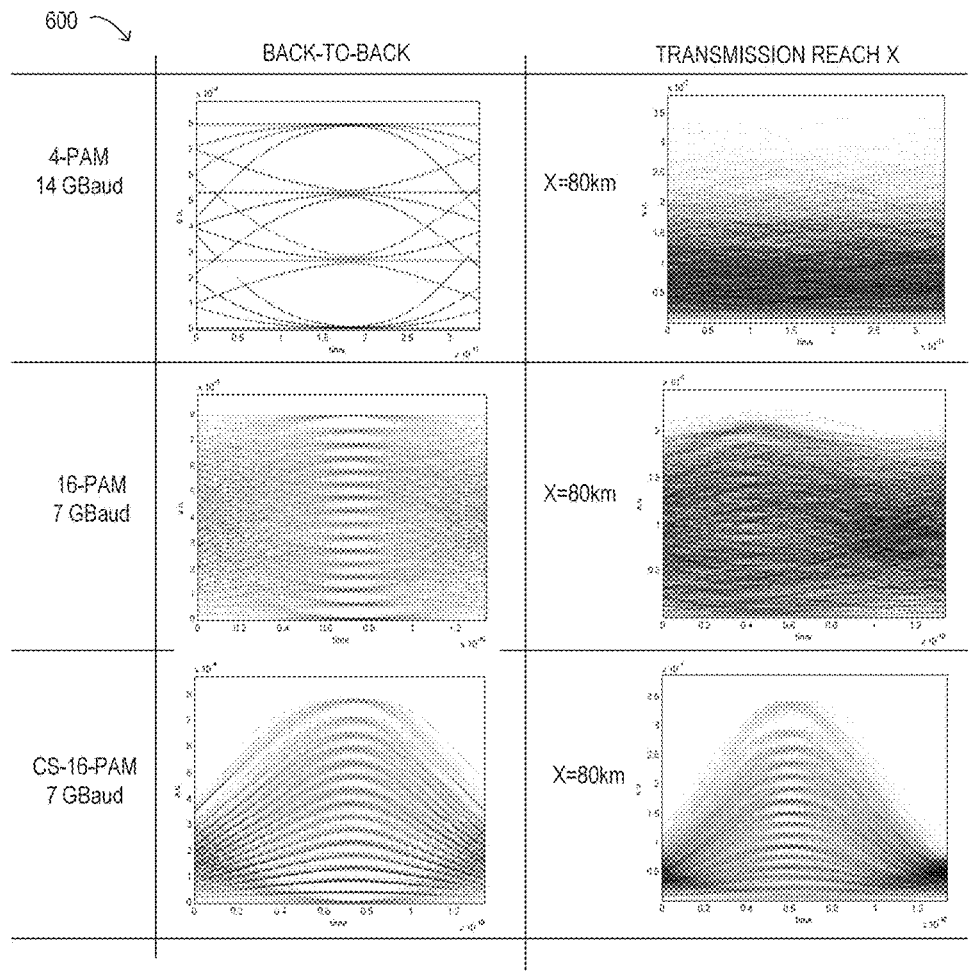
FIG. 6 depicts a set of eye diagrams.

In FIG. 6, various examples of a 28 Gb/s optical signal transmitted without CDC are shown.

In the first row of FIG. 6, 4-PAM signals are shown transmitted at 14 GBaud/s. The BTB eye diagram for 4-PAM 14 GBaud/s shows that 4 levels are clear and distinct, indicating a high optical signal-to-noise ratio (OSNR), while in the eye diagram after 80 km transmission reach, individual levels are no longer distinguishable, indicating an unacceptable OSNR.

In the second row of FIG. 6, 16-PAM signals are shown transmitted at 7 GBaud/s. The BTB eye diagram for 16-PAM 7 GBaud/s shows that 16 levels are clear and distinct, indicating a high optical signal-to-noise ratio (OSNR), while in the eye diagram after 80 km transmission reach, individual levels are no longer distinguishable, indicating an unacceptable OSNR.

In the third row of FIG. 6, CS-16-PAM signals are shown transmitted at 7 GBaud/s. The BTB eye diagram for CS-16-PAM 7 GBaud/s shows that 16 levels are clear and distinct, indicating a high optical signal-to-noise ratio (OSNR). In the eye diagram after 80 km transmission reach, the 16 individual levels are still distinguishable, indicating an acceptable OSNR and an improvement over 16-PAM 7 GBaud/s in the second row.

Figure 7:
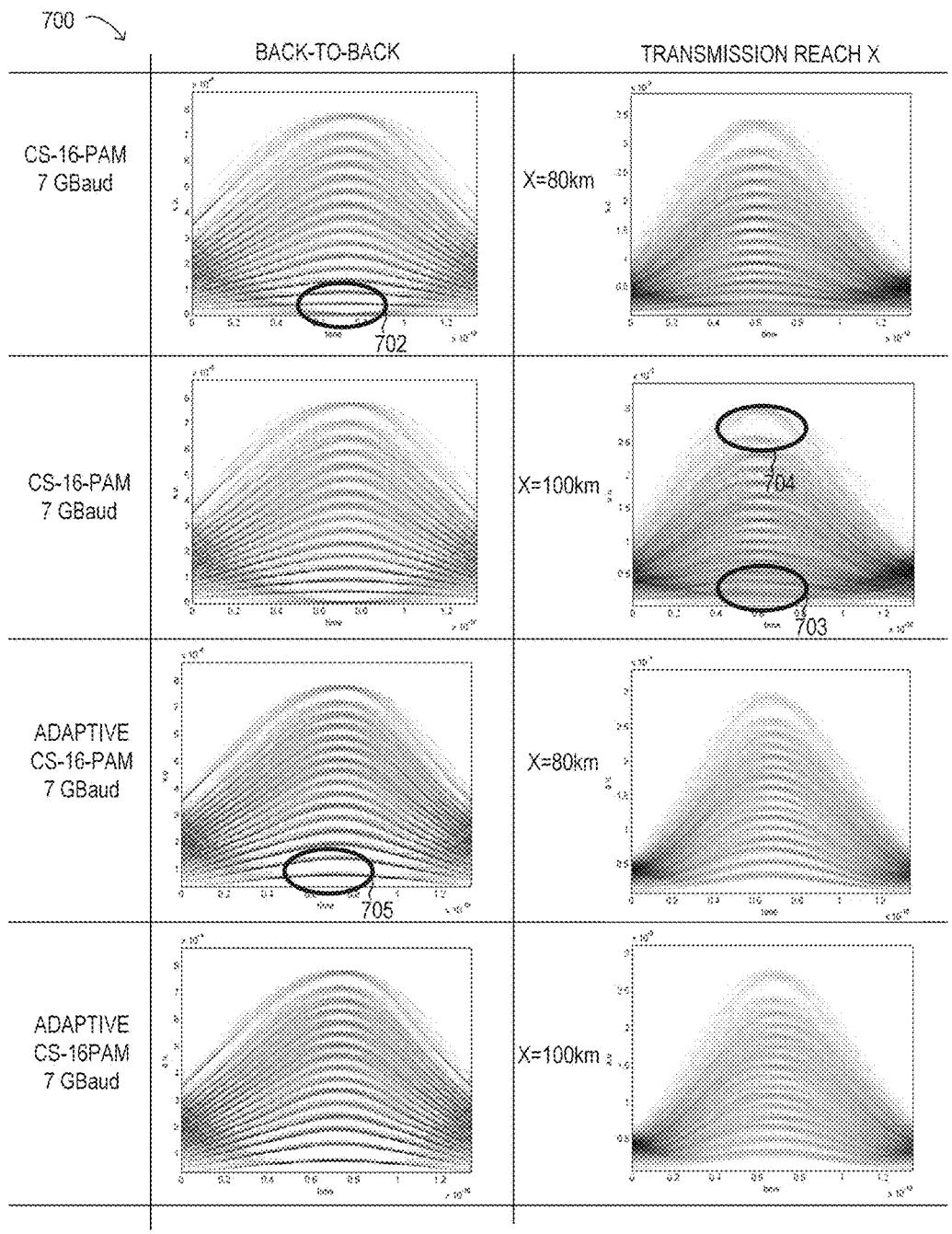
FIG. 7 depicts a set of eye diagrams.

In FIG. 7, various examples of a 28 Gb/s optical signal transmitted without CDC are shown.

In the first row of FIG. 7, CS-16-PAM signals are shown transmitted at 7 GBaud/s. The BTB eye diagram for CS-16-PAM 7 GBaud/s shows that 16 levels are clear and distinct, indicating a high optical signal-to-noise ratio (OSNR). In particular, marker 702 shows that the lowest level is at 0 amplitude. In the eye diagram after 80 km transmission reach, the 16 individual levels are still distinguishable, indicating an acceptable OSNR, but it can be observed that the distinction between the first two levels is not as clear as between some higher levels.

In the second row of FIG. 7, CS-16-PAM signals are shown transmitted at 7 GBaud/s. The BTB eye diagram for CS-16-PAM 7 GBaud/s shows that 16 levels are clear and distinct, indicating a high optical signal-to-noise ratio (OSNR). In the eye diagram after 100 km transmission reach, the 16 individual levels are still distinguishable, but marker 703 shows significant cross talk and loss of OSNR for the first two levels, while marker 704 shows a greater distinction between the last two levels at higher signal levels than marker 703.

In the third row of FIG. 7, adaptive CS-16-PAM signals are shown transmitted at 7 GBaud/s. The BTB eye diagram for adaptive CS-16-PAM 7 GBaud/s shows that 16 levels are clear and distinct, indicating a high optical signal-to-noise ratio (OSNR). In particular, marker 705 shows how the zero level has been rescaled with an offset to increase signal levels at low levels. In the eye diagram after 80 km transmission reach, the 16 individual levels are still distinguishable, indicating an acceptable OSNR, including for the lowest level, which is no longer at zero level.

In the fourth row of FIG. 7, adaptive CS-16-PAM signals are shown transmitted at 7 GBaud/s. The BTB eye diagram for adaptive CS-16-PAM 7 GBaud/s shows that 16 levels are clear and distinct, indicating a high optical signal-to-noise ratio (OSNR). In the eye diagram after 100 km transmission reach, the 16 individual levels are still distinguishable, indicating an acceptable OSNR, including for the lowest level, which is no longer at zero level.

Figure 8:
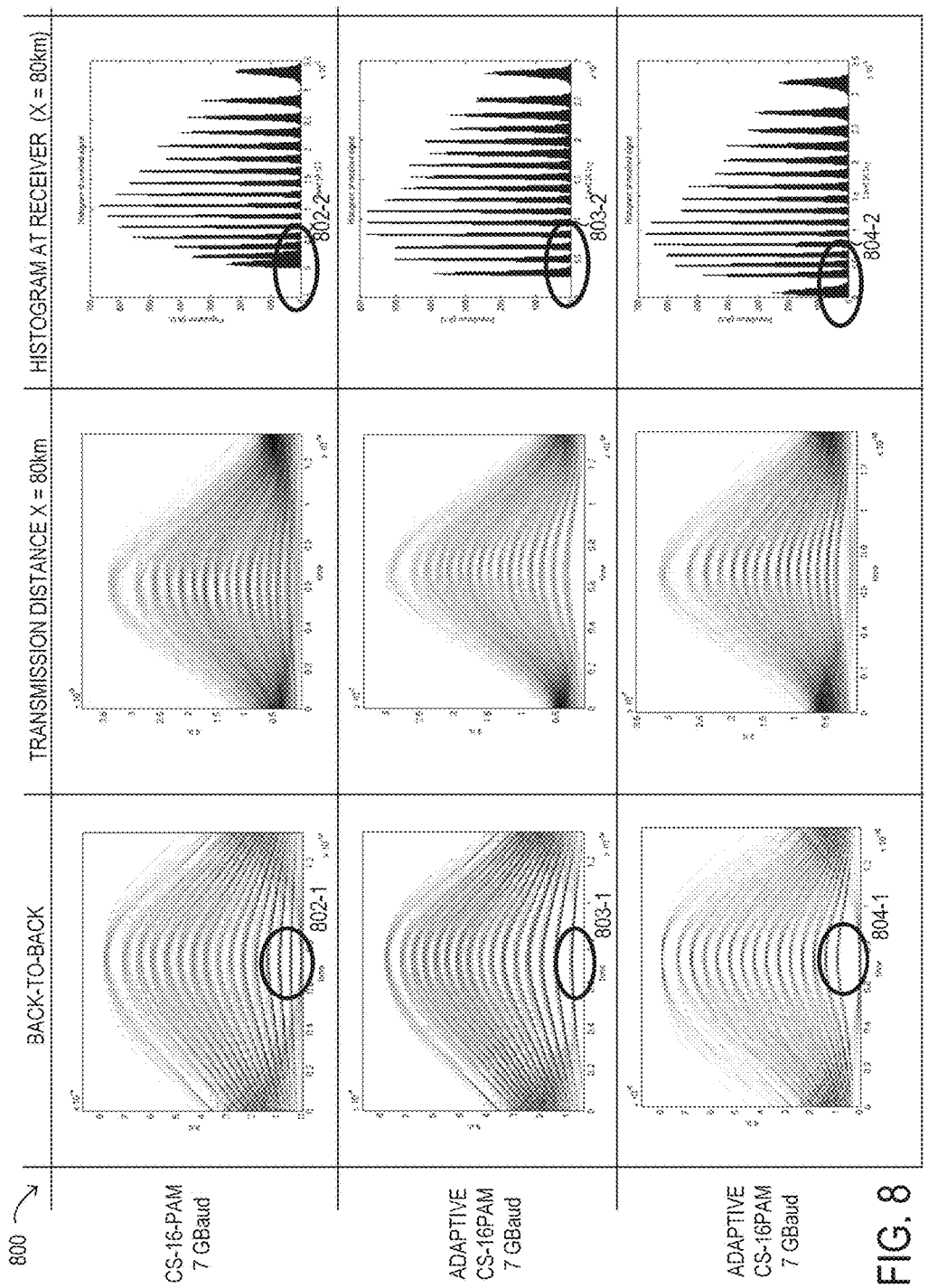
FIG. 8 depicts a set of eye diagrams.

In FIG. 8, various examples of a 28 Gb/s optical signal transmitted without CDC are shown. Also shown in FIG. 8 are histograms of the received symbol pulse levels at the receiver. As shown above in FIG. 7, third and fourth rows, adaptive CS-16-PAM may improve the signal and enable a longer transmission reach due to the higher OSNR achieved.

With CS-16-PAM, the 16 signal levels for the symbol pulses are linearly scaled and are evenly spaced between level 0 through 15, with level 0 corresponding to 0 amplitude. In this case, the symbol pulse amplitude is given by P*(N/15), where P is the maximum amplitude, and N is the level [0 . . . 15].

In the first row of FIG. 8, CS-16-PAM signals are shown transmitted at 7 GBaud/s. In the BTB eye diagram, marker 802-1 shows that the levels are equally spaced. In the eye diagram after 80 km transmission reach, the 16 individual levels are still distinguishable, but significant cross talk and loss of OSNR for the first two levels may be observed. In the histogram of the received signal, marker 802-2 shows that strong cross talk occurs between first two levels 0 and 1, which is undesirable because of the low OSNR that limits the transmission reach.

In a first example of adaptive CS-16-PAM, the 16 signal levels for the symbol pulses are nonlinearly scaled and are unevenly spaced between level 0 through 15, while level 0 offset to an amplitude greater than 0. In this case, the symbol pulse amplitude is given by $P*[(N+1)/16)]^y$, where P is the maximum amplitude, and N is the level [0 . . . 15], and y is an exponent selected to equal 0.7. Thus, the lowest level output is non-zero, given by (N+1)/16, while the peak output level is normalized as 1. The exponent y rescales the output levels with non-equal spacing. For example, the spacing between higher levels will decrease slightly with y=0.7. It will be understood that the first example can be extended to other values of M than M=16 to implement adaptive CS-M-PAM.

In the second row of FIG. 8, adaptive CS-16-PAM signals are shown transmitted at 7 GBaud/s using the first example of adaptive CS-16-PAM described above. In the BTB eye diagram, marker 803-1 shows that the lowest level does not have a zero amplitude. In the eye diagram after 80 km transmission reach, the 16 individual levels are clearly distinguishable, and a clear distinction between the first two levels may be observed, along with a reduced spacing between the higher levels, as compared with the first row in FIG. 8. In the histogram of the received signal, marker 803-2 shows that little or no cross talk occurs between first two levels 0 and 1, while level 0 is at a greater than zero value. Also, the reduced spacing between the higher levels is visible.

In a second example of adaptive CS-16-PAM, the 15 upper signal levels for the symbol pulses are linearly scaled and are evenly spaced between level 1 through 15, while level 0 remains at 0 amplitude. The spacing between level 0 and level 1 is increased to reduce strong cross talk between low levels 0 and 1. In this case, the symbol pulse amplitude is given by P*[(Q+1)/16)], where P is the maximum amplitude, and Q is the level [1 . . . 15]. Thus, the lowest level output is zero, while the peak output level remains normalized as 1. It will be understood that the second example can be extended to other values of M than M=16 to implement adaptive CS-M-PAM.

In the third row of FIG. 8, adaptive CS-16-PAM signals are shown transmitted at 7 GBaud/s using the second example of adaptive CS-16-PAM described above. In the BTB eye diagram, marker 804-1 shows that the space between level 0 and 1 is larger than the space between level 1 and 2. In the eye diagram after 80 km transmission reach, the 16 individual levels are clearly distinguishable, and a clear distinction between the first two levels may be observed. In the histogram of the received signal, marker 804-2 shows that little or no cross talk occurs between first two levels 0 and 1, that level 0 is at zero value and that there is a larger spacing from level 0 to level 1 than in the first example of adaptive CS-16-PAM described above.

Figure 9:
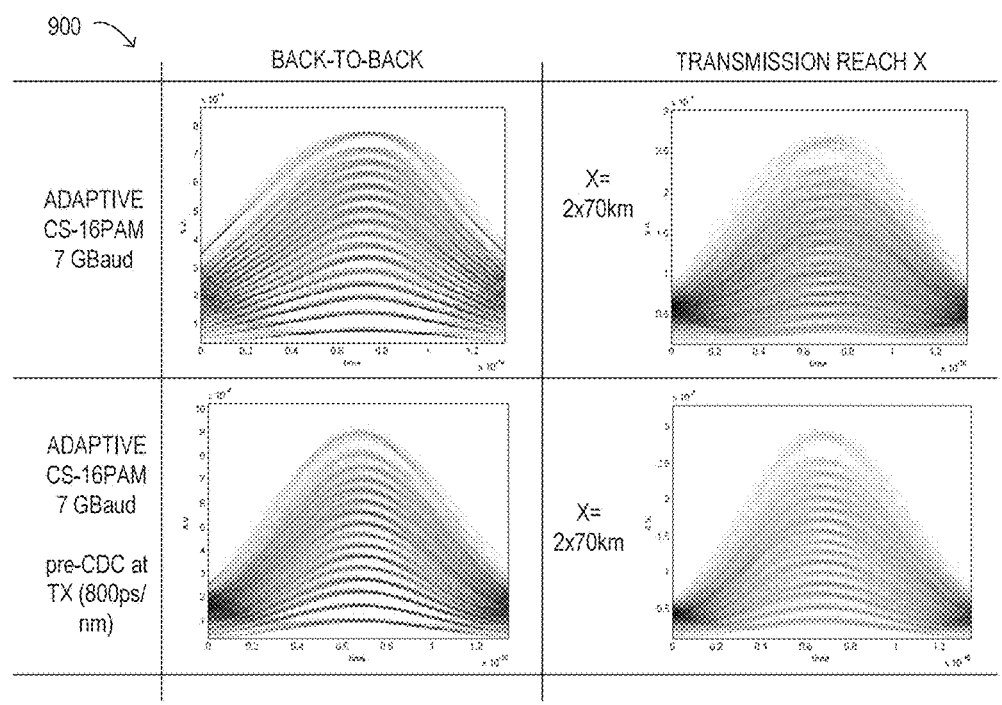
FIG. 9 depicts a set of histograms and eye diagrams.

In FIG. 9, eye diagrams for various examples of adaptive CS-16-PAM are shown.

In the first row of FIG. 9, adaptive CS-16-PAM signals are shown transmitted at 7 GBaud/s using the first example of adaptive CS-16-PAM described above, without CDC at the receiver. The BTB eye diagram for CS-16-PAM 7 GBaud/s shows that 16 levels are clear and distinct, indicating a high optical signal-to-noise ratio (OSNR). In particular, the first level is at a non-zero value according to the first example of adaptive CS-16-PAM described above. In the eye diagram after 2×70 km transmission reach, the 16 individual levels are still somewhat distinguishable, but also show some cross talk indicating a reduction in OSNR.

In the second row of FIG. 9, adaptive CS-16-PAM signals are shown transmitted at 7 GBaud/s using the first example of adaptive CS-16-PAM described above, but with a fixed pre-compensation of CD at the transmitter of 800 ps/nm. In one example, pre-compensation of CD may be implemented by using a chipped Bragg grating at the transmitter. The BTB eye diagram for CS-16-PAM 7 GBaud/s shows that 16 levels are clear and distinct, indicating a high optical signal-to-noise ratio (OSNR). In particular, the first level is at a non-zero value according to the first example of adaptive CS-16-PAM described above. In the eye diagram after 2×70 km transmission reach, the 16 individual levels are still clearly distinguishable, indicating an improvement in OSNR as compared with the first row of FIG. 9. In this example, the transmission range may be from BTB to 2×70 km without adjusting the CD compensation for a specific target distance. In some embodiments, because the adaptive CS-M-PAM has a large tolerance to residual CD, the range of transmission distance may be extended by adding a fixed pre-compensation of CD at the transmitter.

Figure 10:
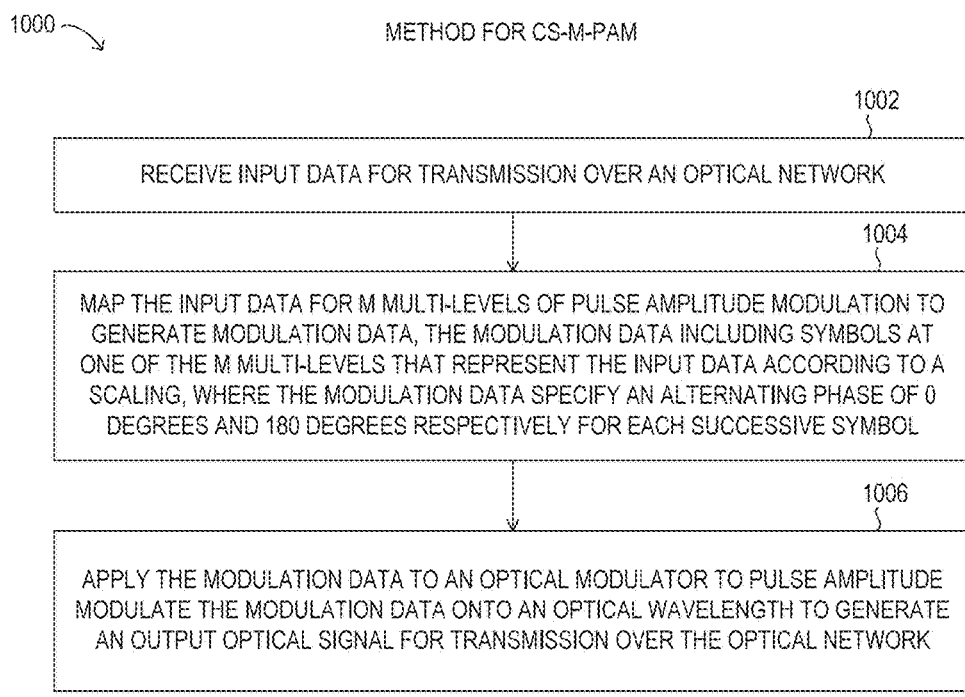
FIG. 10 is a flow chart of selected elements of a method for carrier suppressed multi-level pulse amplitude modulation.

Referring now to FIG. 10, a flowchart of selected elements of an embodiment of method 1000 for CS-M-PAM, as described herein, is depicted. Method 1000 may be performed using optical transport network 101 by transmitter 102, which may communicate with various components in optical transport network 101, as described above. It is noted that certain operations described in method 1000 may be optional or may be rearranged in different embodiments.

Method 1000 may begin at step 1002 by receiving input data for transmission over an optical network. At step 1004, the input data are mapped for M multi-levels of pulse amplitude modulation to generate modulation data, the modulation data including symbols at one of the M multi-levels that represent the input data according to a scaling, where the modulation data specify an alternating phase of 0 degrees and 180 degrees respectively for each successive symbol. At step 1006, the modulation data are applied to an optical modulator to pulse amplitude modulate the modulation data onto an optical wavelength to generate an output optical signal for transmission over the optical network.

As disclosed herein, carrier suppression (CS-M-PAM) may be applied to M-PAM modulated optical signals to improve transmission reach. Additional rescaling of CS-M-PAM, referred to adaptive CS-M-PAM, may further improve transmission reach by reducing low level symbol interference.

While the subject of this specification has been described in connection with one or more exemplary embodiments, it is not intended to limit any claims to the particular forms set forth. On the contrary, any claims directed to the present disclosure are intended to cover such alternatives, modifications and equivalents as may be included within their spirit and scope.

What is claimed is:

1. A method for carrier suppressed multi-level pulse amplitude modulation, the method comprising:
   receiving input data for transmission over an optical network;
   mapping the input data for M multi-levels of pulse amplitude modulation to generate modulation data, the modulation data including symbols at one of the M multi-levels that represent the input data according to a scaling, wherein the modulation data specify an alternating phase of 0 degrees and 180 degrees respectively for each successive symbol;
   applying the modulation data to an optical modulator to pulse amplitude modulate the modulation data onto an optical wavelength to generate an output optical signal for transmission over the optical network.

2. The method of claim 1, wherein the optical modulator is a Mach-Zehnder modulator.

3. The method of claim 1, wherein mapping the input data further comprises:
   applying a linear scaling for the scaling in which a zero value in the input data is mapped to a zero value in the modulation data.

4. The method of claim 3, wherein mapping the input data further comprises:
   mapping using the linear scaling for levels 0 to M−1 of the M multi-levels, wherein a first difference in level between level 0 and level 1 is increased to be greater than a second difference between successive levels in the linear scaling.

5. The method of claim 1, wherein mapping the input data further comprises:
   applying a non-linear scaling for the scaling in which a zero value in the input data is mapped to a greater-than-zero value in the modulation data.

6. The method of claim 1, further comprising:
   applying a fixed pre-compensation for chromatic dispersion to the output optical signal.

7. An optical transmitter, comprising:
   a data mapping module enabled for:
   receiving input data for transmission over an optical network; and
   mapping the input data for M multi-levels of pulse amplitude modulation to generate modulation data, the modulation data including symbols at one of the M multi-levels that represent the input data according to a scaling, wherein the modulation data specify an alternating phase of 0 degrees and 180 degrees respectively for each successive symbol; and
   an optical modulator enabled for:
   receiving the modulation data; and
   pulse amplitude modulating the modulation data onto an optical wavelength to generate an output optical signal for transmission over the optical network.

8. The optical transmitter of claim 7, wherein the optical modulator is a Mach-Zehnder modulator.

9. The optical transmitter of claim 7, wherein mapping the input data further comprises:
   applying a linear scaling for the scaling in which a zero value in the input data is mapped to a zero value in the modulation data.

10. The optical transmitter of claim 9, wherein mapping the input data further comprises:
    mapping using the linear scaling for levels 0 to M−1 of the M multi-levels, wherein a first difference in level between level 0 and level 1 is increased to be greater than a second difference between successive levels in the linear scaling.

11. The optical transmitter of claim 7, wherein mapping the input data further comprises:
    applying a non-linear scaling for the scaling in which a zero value in the input data is mapped to a greater-than-zero value in the modulation data.

12. The optical transmitter of claim 7, further comprising:
    a chromatic dispersion compensator for applying a fixed pre-compensation for chromatic dispersion to the output optical signal.

13. An optical network system comprising:
    an optical transmitter further comprising:
    a data mapping module enabled for:
    receiving input data for transmission over an optical network; and
    mapping the input data for M multi-levels of pulse amplitude modulation to generate modulation data, the modulation data including symbols at one of the M multi-levels that represent the input data according to a scaling, wherein the modulation data specify an alternating phase of 0 degrees and 180 degrees respectively for each successive symbol; and
    an optical modulator enabled for:
    receiving the modulation data; and
    pulse amplitude modulating the modulation data onto an optical wavelength to generate an optical signal for transmission over the optical network.

14. The optical network system of claim 13, further comprising:
    an optical receiver enabled for:
    receiving the optical signal after transmission over the optical network;
    demodulating the optical signal to reconstruct the input data, wherein an inverse of the scaling is applied to the optical signal.

15. The optical network system of claim 13, wherein the optical modulator is a Mach-Zehnder modulator.

16. The optical network system of claim 13, wherein mapping the input data further comprises:
    applying a linear scaling for the scaling in which a zero value in the input data is mapped to a zero value in the modulation data.

17. The optical network system of claim 16, wherein mapping the input data further comprises:
    mapping using the linear scaling for levels 0 to M−1 of the M multi-levels, wherein a first difference in level between level 0 and level 1 is increased to be greater than a second difference between successive levels in the linear scaling.

18. The optical network system of claim 13, wherein mapping the input data further comprises:
    applying a non-linear scaling for the scaling in which a zero value in the input data is mapped to a greater-than-zero value in the modulation data.

19. The optical network system of claim 13, further comprising:
    a chromatic dispersion compensator for applying a fixed pre-compensation for chromatic dispersion to the optical signal prior to transmission over the optical network.

* * * * *